United States Patent [19]

Hurst

[11] 4,023,256

[45] May 17, 1977

[54] METHODS OF FASTENING WOOD VENEER SHEETS IN EDGE-TO-EDGE RELATIONSHIP

[76] Inventor: Autry E. Hurst, 1812 E. Austin, Nacogdoches, Tex. 75961

[22] Filed: Oct. 3, 1975

[21] Appl. No.: 619,192

Related U.S. Application Data

[62] Division of Ser. No. 475,855, June 4, 1974, Pat. No. 3,911,978.

[52] U.S. Cl. .................................. 29/433; 29/505; 29/521; 29/526; 403/300

[51] Int. Cl.$^2$ .......................................... B23P 19/04

[58] Field of Search ............ 29/433, 526, 505, 241, 29/521; 144/313, 314 B, 314 R, 309 R, 2 R; 52/758 D, 760, 753 J, 753 K, 753 W; 403/300; 140/3 C

[56] References Cited

UNITED STATES PATENTS

| | | | |
|---|---|---|---|
| 1,902,716 | 3/1933 | Newton | 52/753 K X |
| 2,815,568 | 12/1957 | Bianca et al. | 29/433 X |
| 3,277,935 | 10/1966 | Rebick | 144/309 Z X |
| 3,490,974 | 1/1970 | Jacobson | 156/166 |
| 3,705,829 | 12/1972 | Brenneman et al. | 156/148 X |
| 3,892,027 | 7/1975 | Jabsen | 29/433 |

*Primary Examiner*—Victor A. DiPalma
*Attorney, Agent, or Firm*—Joseph H. Schley; Thomas L. Cantrell

[57] ABSTRACT

Substantially rectangular veneer sheets of random lengths and widths are fastened in edge-to-edge relationship by raising integral fluke-like hooks or teeth in each sheet, abutting the edges of adjacent sheets, engaging continual strings or threads beneath the raised hooks, and depressing said hooks into planar relation with the sheets to provide a composite strip of veneer.

18 Claims, 6 Drawing Figures

METHODS OF FASTENING WOOD VENEER SHEETS IN EDGE-TO-EDGE RELATIONSHIP

This is a division of application Ser. No. 475,855, filed June 4, 1974, now U.S. Pat. No. 3,911,978.

BACKGROUND OF THE INVENTION

In the manufacture of plywood, it is customary to utilize substantially rectangular scraps or small pieces or sheets of inexpensive and/or inferior veneer to form the layers or laminae of the core and to fasten together the small sheets edge-to-edge by continuous strings or threads which are secured to said sheets by adhesive or stitching and thereby provide a composite strip. A number of strips are assembled to form a full size core layer and additional layers are added until the core is of the desired thickness. It is readily apparent that stitching or sewing and adequate gluing require the use of relatively complicated equipment which increases the cost of manufacture, since stitching necessitates passing of strings through the sheets and/or around portions thereof and the mere gluing of strings to one of the faces of said sheets has proven to be insufficient to permit the necessary handling of the composite strips without disintegration thereof.

SUMMARY OF THE INVENTION

This improvement in the art of manufacturing plywood cores involves the positive attachment of substantially rectangular veneer scraps or small sheets or pieces of random lengths and widths in abutting or edge-to-edge engagement without the use of sewing adhesives, or stitching, a bobbin or two threads or strings being required for sewing or stitching. Each sheet is deformed or upset transversely of its flat faces, such as by suitable punching means to provide one or more series of integral raised fluke-like hooks or teeth projecting or upstanding from one of said faces for receiving continuous strings or threads therebeneath. The engaged portions of each string or thread is confined against displacement by depressing or flattening the hooks into substantially planar relation to the flat faces of the sheets. Due to the thinness of the sheets and the consequent thinness of the hooks, it is preferable that said hooks have appreciable width and greater length and that the longitudinal margins thereof extend in the direction of the grain of said sheets to prevent transverse splitting and separation of said hooks. Manifestly, the positive connections provided by the hooks prevent endwise as well as transverse displacement of each string or thread. Due to this method, it is unnecessary to force the string or thread through the sheets or to employ bobbins, needles and/or two strings or threads.

DESCRIPTION OF AN EMBODIMENT

Figure 1:
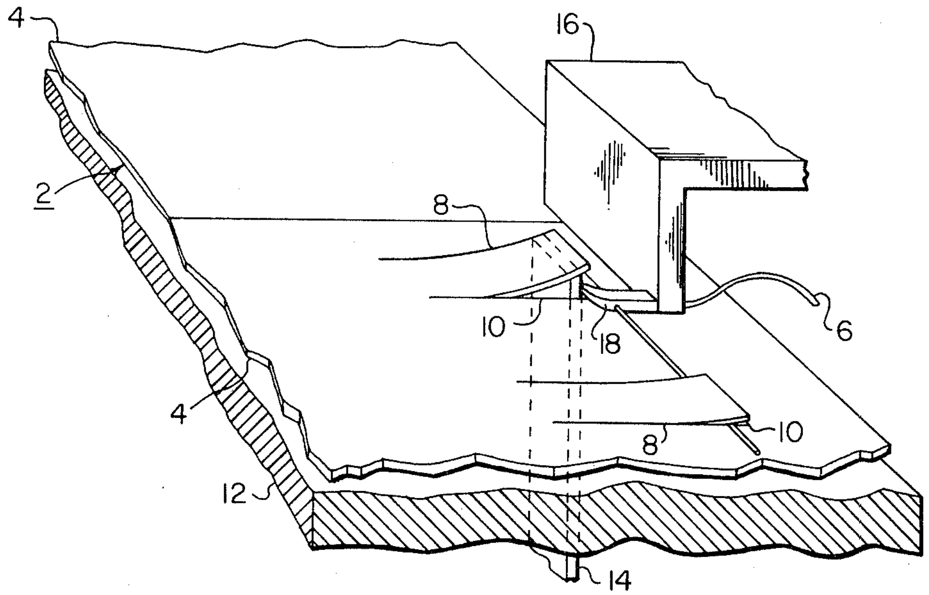
FIG. 1 is a fragmentary perspective view illustrating an apparatus for fastening sheets in edge-to-edge relationship in accordance with the method of the invention.

In the drawings, the numeral 2 designates a strip of thin wooden veneer scraps or small sheets 4 connected to one another by a continual string or thread 6. The sheets are substantially rectangular and may be of random widths and lengths. As is well-known in the art, it is customary to utilize scraps in at least some of the laminae or layers of the core of plywood panels and to assemble the scraps in composite strips which are glued to underlying and overlying core laminae. In addition to cutting the strips to desired length, each strip is trimmed to a uniform width prior to assembly in full-size panels. Of course, this width may vary from strip to strip and, if desired, the scraps may be trimmed to selected widths prior to assembly in strip form. Manifestly, the exact manner of assembly is subject to variation since most manufacturers are equipped to handle core material or laminae in strip form. The primary difficulty arises in compositing the scraps or small sheets of wooden veneer in strips which will not disintegrate during handling.

Figure 2:
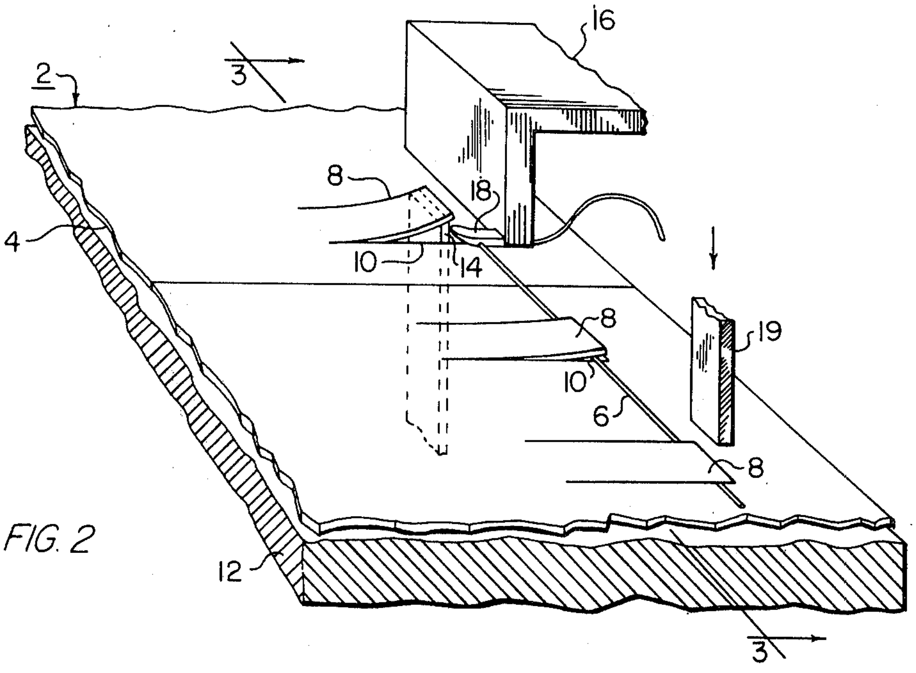
FIG. 2 is a view, similar to FIG. 1, showing the hook-closing step of the method.
Figure 3:
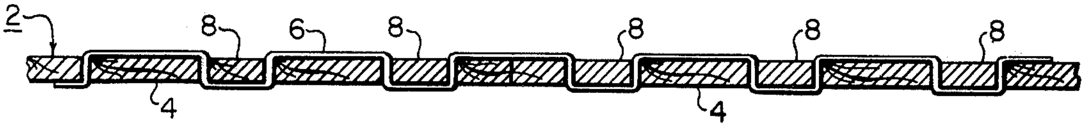
FIG. 3 is a longitudinal sectional view, taken on the line 3—3 of FIG. 2, illustrating the connected sheets only.

In carrying out the method of the invention and as shown in FIGS. 1 and 2, each sheet 4 is deformed perpendicularly, preferably upwardly, of its flat faces at spaced intervals between its lateral or longitudinal margins to provide one or more integral fluke-like hooks or teeth 8 which upstand or project outwardly from said sheet sufficiently to form notches or recesses 10 therebeneath for receiving portions of the string 6 which feeds from suitable means (not shown). The sheets are arranged in edge-to-edge or sidewise abuttment in strip form with the grain of each sheet extending transversely of the strip 2 and of the direction of travel of said sheets. The latter are conducted in strip form by suitable supporting and/or conveying means 12 to underlying punch means 14 and overlying, opposed, offset, coacting anvil means 16 for forming the hooks 8, then beneath threading means 18 for directing or positioning the thread 6 longitudinally over the strip of sheets and through the notches or recesses 10 under said hooks as well as maintaining the fed string taut, and then to overlying compaction or pressure means 19 (FIG. 2) for depressing or forcing said hooks into substantially planar relation to said sheets so as to close said recesses (FIG. 3).

The hooks are substantially rectangular and relatively wide so as to resemble broad flat teeth or keepers, appreciable width being desirable due to the thinness of the veneer sheets 4. Manifestly, the hooks are of maximum strength since the lateral margins thereof extend in the direction of the grain of each sheet. After engagement of the string 6 in the notches 10 and closing thereof upon depressing or inward movement of the hooks 8, said string is confined against transverse as well as longitudinal displacement (FIG. 3). Due to the tautness of the string, the sheets 4 are connected positively in abutting relationship to provide the elongate continuous strip 2.

It is noted that the number of hooks in each sheet varies in accordance with its width or dimension longitudinally of the strip. Although the spacing between the hooks 8 is shown as being uniform, it is readily apparent that said spacing may be varied as desired or required. Obviously, the open ends of the hooks must extend transversely of the grain of each sheet, since said hooks would be extremely weak and subject to transverse splitting if said open ends were parallel to said grain. In addition, the preferred disposition of the hooks 8 is conducive to the desired planar closing thereof as well as the splitting of the sheets to form the lateral margins or sides of said hooks.

A single row of hooks may be sufficient for each strip of relatively short length, and the string need not be continuous or one-piece so long as each sheet is attached to both of its contiguous or abutting sheets. In the event that the sheets 4 are of appreciable length or dimension transverse of the sheet 2, two or more rows of hooks 8 may be employed. The string or thread 6 may be fed from a suitable source (not shown) to the threader 18 which overlies the sheets and is disposed adjacent and downstream of the punch means 14 and its coacting anvil means 16. As shown in FIGS. 1 and 2, the overlying punch means may be in the form of an upright, elongate narrow blade, having a bevelled or chisel surface (shown at 15 in FIGS. 4 and 5) on its free or upper end, reciprocal transversely of the flat faces of the sheets 4 and of the grain thereof for cutting the hooks in said sheets whereby the opposed lateral margins or longtudinal sides of said hooks are parallel to said grain. Also, the compaction or pressure means 18 may be in the form of an upright, narrow, reciprocal member or blade having a flat free or lower end surface.

DESCRIPTION OF ANOTHER EMBODIMENT

Figure 4:
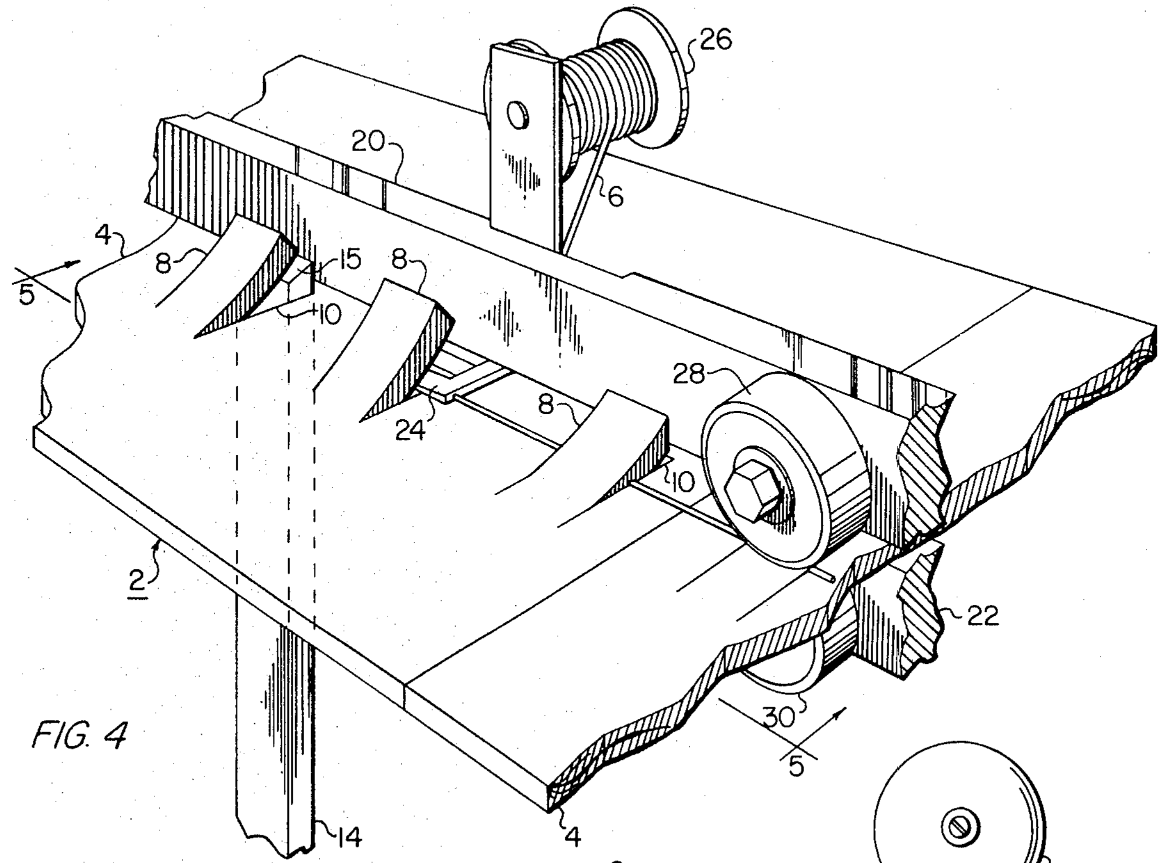
FIG. 4 is a fragmentary perspective view of another embodiment of the invention.
Figure 5:
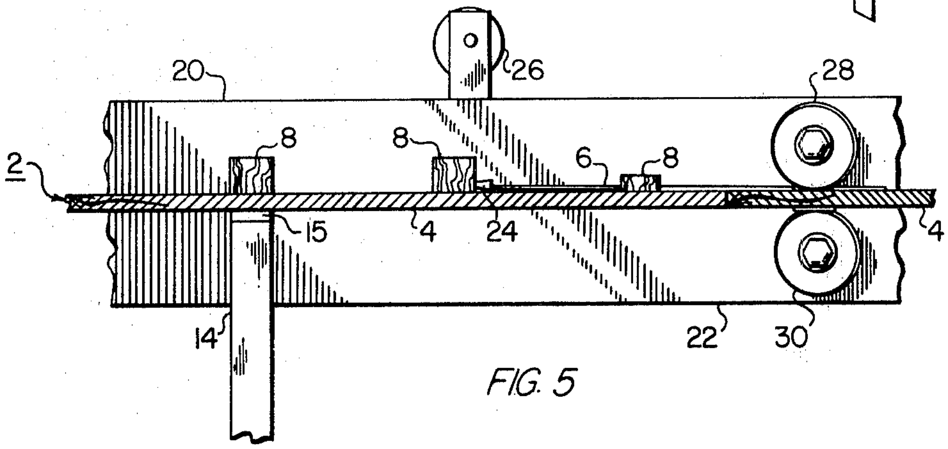
FIG. 5 is a longitudinal sectional view taken on the line 5—5 of FIG. 4.

In FIGS. 4 and 5, the sheets 4 are fed in abutting or edge-to-edge engagement to another embodiment for performing the method of this invention and this embodiment including a pair of substantially horizontal parallel guide members or bars 20, 22 disposed in substantially vertical alignment for receiving portions of said abutting sheets therebetween. The upper or overlying guide bar 20 performs the function of the anvil means 16 of FIGS. 1 and 2 in coaction with the underlying, upright, reciprocal punch member or blade 14, the bevelled or chisel edge 15 of said blade being best shown in FIG. 4. It is noted that the punch member is closely adjacent but offset from the anvil means and may have sliding engagement with the adjacent upright surfaces of the guide bars, whereby said bars coact with said punch member in determining the location of the hooks 8 and in assuring uniform even outer or free ends on said hooks to thereby prevent snagging of the thread or string 6.

Horizontal threading means 24, similar to the threader 18, is mounted on the upper guide bar and projects laterally and substantially horizontally therefrom so as to overlie the sheets 4 for positioning the thread or string in the same manner as said threader 18. As illustrated, a supply reel or spool 26 for the string 6 may be mounted on or adjacent the guide bar 20. Instead of employing the coaction of the reciprocal compaction or pressure member 19 and supporting means 12, the hooks or teeth 8 of the sheets are adapted to be closed or depressed into planar relation to said sheets by a pair or more of vertically aligned coacting rollers or wheels 28, 30 mounted, for rotation about parallel and substantially horizontal axes, upon the overlying and underlying guide bars 20, 22, respectively. The overlying roller 28 functions as the compaction or pressure means, while underlying roller 30 provides an anvil in the same manner as the supporting means 12 of FIGS. 1 and 2. As shown, the rollers and/or compaction means are substantially aligned with the punch member 14 longitudinally of the strip 2 so as to be contiguous the adjacent surfaces of the guide bars.

Figure 6:
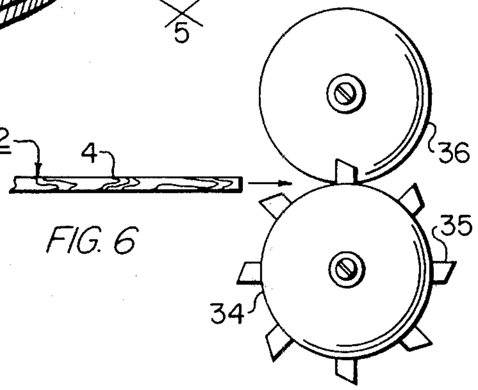
FIG. 6 is an end elevational view of modified punch and anvil means.

As shown in FIG. 6, the punch means 14 and anvil means 16 may be rotary in lieu of said punch means being reciprocal and said anvil means stationary. In this modification, a smooth anvil roller or wheel 36, similar to the rollers 28, 30, is suitably mounted for rotation about a substantially horizontal axis in overlying relation to the sheets 4 of the strip 2 as well as to the punch means. The latter comprises a punch wheel or roller 34, having evenly spaced teeth 35 on its periphery, for rotation about a substantially horizontal axis in underlying relation and parallel alignment to the axis of the smooth anvil roller 36. Although not illustrated, it is obvious that the teeth 35 of the punch wheel 34 must be offset relative to the anvil roller.

I claim:

1. The method of fastening together substantially rectangular wooden veneer sheets in contiguous edge-to-edge relationship which includes
   arranging a plurality of sheets in edge-to-edge abuttment,
   forming at least one integral fluke-like hook in each sheet,
   each hook projecting from its sheet at an angle sufficient to provide a notch therebeneath,
   threading string-like means through each notch so as to connect contiguous sheets to one another,
   depressing each hook into planar relation to its sheet so as to confine a portion of the string-like means against the face of said hook in opposed relation to the other face of said sheet against which adjacent portions of said means are confined, thereby providing a continuous composite strip.

2. The method defined in claim 1 wherein
   the string-like means is substantially continuous throughout the length of the composite strip 3. The method defined in claim 1 wherein
   the string-like means is connected to the sheets solely by frictional engagement in the notches when the hooks are depressed.

4. The method defined in claim 3 wherein
   each hook is formed by deforming a portion of each sheet so as to cut said sheet transversely of its grain for providing a transverse end margin for the hook and so as to split said sheet longitudinally of its grain at each extremity of said end margin of said hook for providing opposed lateral margins for said hook.

5. The method defined in claim 4 including
   maintaining tension on the string-like means during the fastening together of the sheets so as to prevent slack in said means and consequent spacing of said sheets.

6. The method defined in claim 5 wherein
   each hook has its transverse end margin extending longitudinally of the composite strip and its opposed lateral margins extending transversely of said strip.

7. The method defined in claim 1 wherein
   each sheet has its grain extending transversely of the string-like means.

8. The method defined in claim 7 wherein
   each hook is formed by deforming a portion of each sheet so as to cut said sheet transversely of its grain to provide a transverse end margin for said hook and so as to split said sheet longitudinally if its grain at each extremity of said end margin of said hook to provide opposed lateral margins for said hook.

9. The method defined in claim 8 including maintaining tension on the string-like means during the fastening together of the sheets so as to prevent slack in said means and consequent spacing of said sheets.

10. The method defined in claim 9 wherein each hook has its transverse end margin extending longitudinally of the composite strip and its opposed lateral margins extending transversely of said strip.

11. The method defined in claim 3 wherein each hook has a transverse end margin extending longitudinally and opposed lateral margins extending transversely of the composite strip.

12. The method defined in claim 1 wherein each hook is formed by deforming a portion of each sheet so as to cut said sheet transversely of its grain for providing a transverse end margin for the hook and so as to split said sheet longitudinally of its grain at each extremity of said end margin of said hook for providing opposed lateral margins for said hook.

13. The method defined in claim 12 including maintaining tension on the string-like means during the fastening together of the sheets so as to prevent slack in said means and consequent spacing of said sheets.

14. The method defined in claim 13 wherein each hook has its transverse end margin extending longitudinally of the composite strip and its opposed lateral margins extending transversely of said strip.

15. The method defined in claim 1 including maintaining tension on the string-like means during the fastening together of the sheets so as to prevent slack in said means and consequent spacing of said sheets.

16. The method defined in claim 15 wherein each hook has its transverse end margin extending longitudinally of the composite strip and its opposed lateral margins extending transversely of said strip.

17. The method defined in claim 16 wherein each sheet has its grain extending transversely of the string-like means.

18. The method defined in claim 15 wherein each hook has its transverse end margin extending longitudinally of the composite strip and its opposed lateral margins extending transversely of said strip.

* * * * *